Sept. 10, 1940.    J. W. DENNIS    2,214,498
CACTUS ERADICATOR
Filed July 1, 1938    2 Sheets-Sheet 1
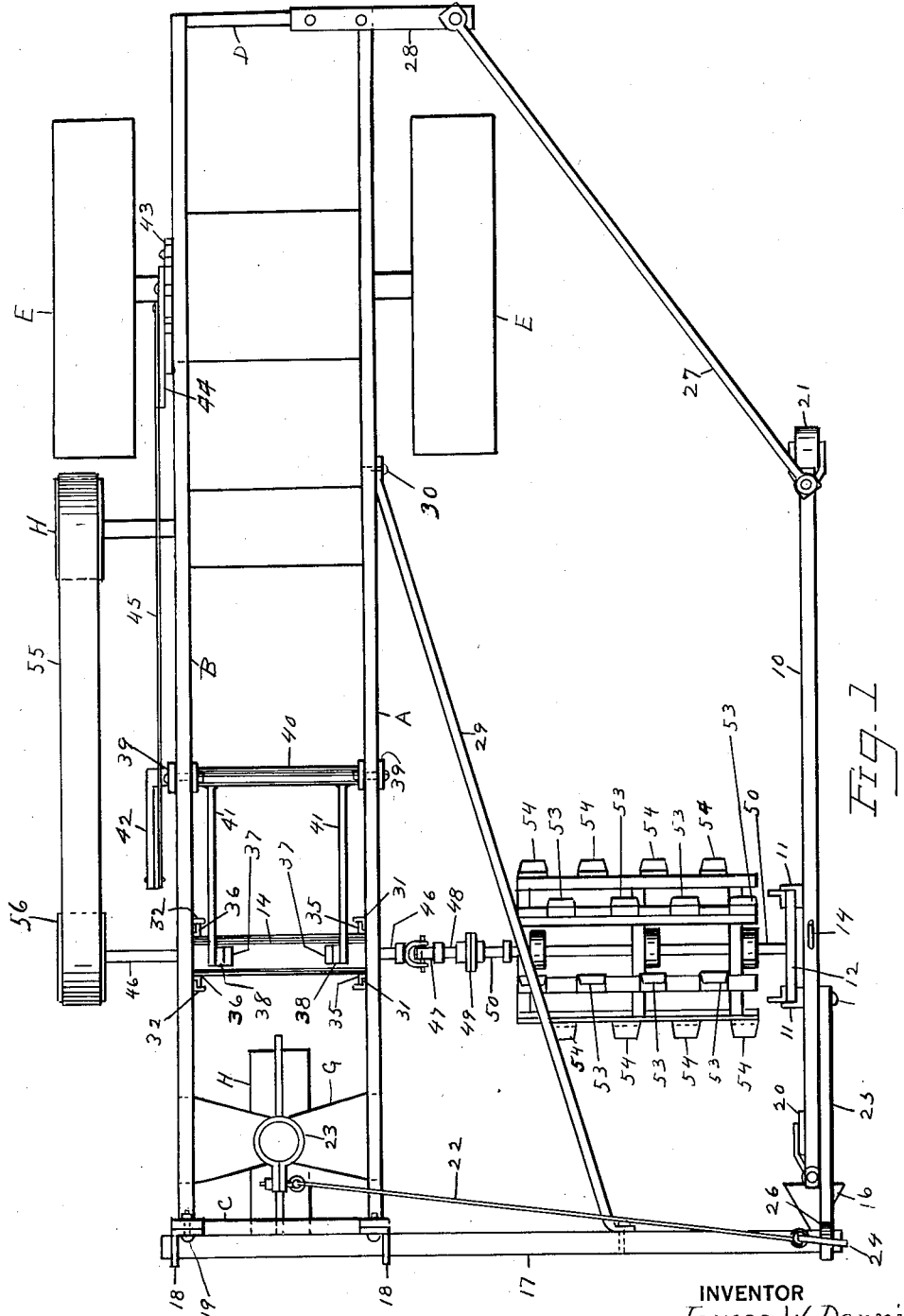
INVENTOR
James W. Dennis
BY Fred E. Mefford
ATTORNEY Sept. 10, 1940. J. W. DENNIS 2,214,498
CACTUS ERADICATOR
Filed July 1, 1938 2 Sheets-Sheet 2
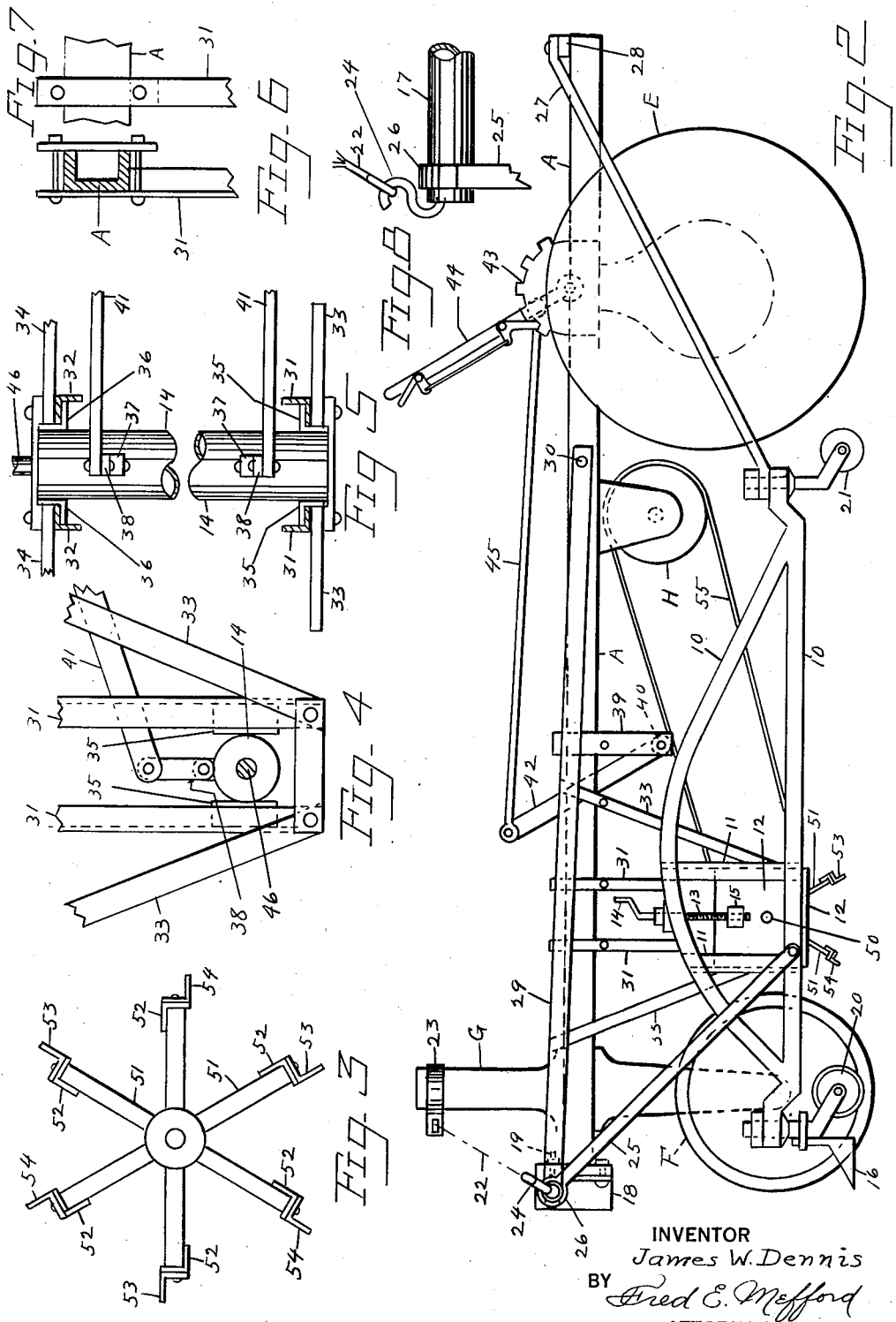
INVENTOR
James W. Dennis
BY Fred E. Mefford
ATTORNEY Patented Sept. 10, 1940

2,214,498

UNITED STATES PATENT OFFICE 2,214,498

CACTUS ERADICATOR

James W. Dennis, Elbert County, Colo.

Application July 1, 1938, Serial No. 216,993

9 Claims. (Cl. 56—26)

My invention relates to agricultural implements and my object in general is to provide an attachment for tractors for use in eradicating cacti and other objectionable vegetable growth on land.

Other objects are, to provide means and facilities in said attachment to accommodate uneven ground surfaces; to provide vertical adjusting means at both ends of the revolving mechanism; to provide means to level a path for the caster wheels; and to provide facilities whereby the power to operate the attachment can be derived from the tractor. Other objects will appear as the description progresses.

Since the tractor is not my invention, the details are not shown except to illustrate how my attachment is connected thereto. The diagram of the tractor is shown in broken lines so that my attachment can be differentiated from the tractor without having to refer to the specification.

Figure 1 represents a plan view of my attachment connected to a tractor; Fig. 2, a side view of Fig. 1; Fig. 3, an enlarged view of the paddle carrying structure; Fig. 4, a fragmentary view of the vertical guides showing the housing mounted therein; Fig. 5, a plan view of Fig. 4; Fig. 6, a fragmentary view showing how the vertical guides are connected to the tractor side bars; Fig. 7, a side view of Fig. 6; and Fig. 8, a fragmentary view showing how the cable is hooked to the arm 17.

Although I show the preferred embodiment of my invention, I do not thereby limit myself to the precise form shown, but wish it understood that within the scope of what hereinafter is claimed, various changes in the precise details may be made without departing from the spirit of the invention.

My attachment comprises a vertically disposed frame 10; means to attach said frame to the tractor; a bearing plate 12 mounted on said frame; adjusting means for said bearing plate; vertically disposed guides adapted to be mounted on said tractor; a housing 14 slidably mounted in said guides; lifting means for said housing; an actuating shaft journalled in said housing; an intermediate shaft; means connecting the actuating shaft and the intermediate shaft; a reel carrying shaft; a reel mounted on said reel carrying shaft, and knife blades mounted on said reel.

The reference characters A—B indicate the side bars of the tractor; C, the front cross bar; D, the rear cross bar; E—E, the rear wheels; F, the front wheel; G, the steering column; and H, the tractor pulley.

The frame 10 is provided with caster wheels 20 and 21 each having its shank journalled in the frame 10. Vertical guides 11 are welded to the frame 10 and a bearing plate 12 slidably mounted in the guides 11. A screw 13, provided with a crank 14, extends through the top of the frame 10 and is screwed into a block 15 welded to the plate 12. A leveling shoe 16 is mounted on the shank of the caster wheel 20.

The means to connect my attachment to the tractor comprise a supporting arm 17 mounted in angles 18 which are secured to the front end of the tractor. A bolt 19 secures the arm 17 from slipping out of the angles. A cable 22 is secured to a collar 23 embracing the steering column G, and is provided with a hook 24 which is hooked in the end of the arm 17. A bar 25 is connected to the frame 10 and provided with a collar 26 which is mounted on the arm 17. A bar 27 connects the rear of the frame 10 to a bar 28 which is mounted on the rear cross bar D of the tractor. A brace bar 29 extends from the arm 17 to the side bar A and secured thereto by a bolt 30.

The vertical guides comprise a pair of angles 31—31 secured to the side bar A and a pair of angles 32—32 secured to the side bar B. Braces 33—33 extend from angles 31—31 and braces 34—34 extend from the angles 32—32 to side bars A and B, respectively.

The housing 14 has welded thereto a pair of angles 35—35 which are slidably mounted in the angles 31—31. Similar angles 36—36 are welded to housing 14 and slidably mounted in angles 32—32. Lugs 37 extend upward from housing 14 and link bars 38—38 are pivotally connected to said lugs. The lifting means for the housing 14 comprise a pair of depending bars 39—39 secured to the side bars of the tractor; a shaft 40 mounted in bars 39—39; arms 41—41 welded to the shaft 40 and pivotally connected to the link bars 38—38; and a lever arm 42 secured to the shaft 40. A quadrant 43 is mounted on the side bar B; a lever 44 is mounted on the quadrant 43; and a connecting rod 45 connects the lever 44 and the lever 42.

An actuating shaft 46 is mounted in the housing 14 and extends therethrough; a universal joint 47 connects the shaft 46 to an intermediate shaft 48; and a friction clutch 49 connects the intermediate shaft 48 to the reel carrying shaft 50 which is journalled in the bearing plate 11. The reel comprises a plurality of spiders 51 and longitudinal angle bars 52 mounted on the legs of the spiders 51. Paddles 53—54 are secured to the angle bars 52, the paddles on each alternate angle bar being staggered with reference to the adjacent angle bar.

Power to operate the actuating shaft is derived from the tractor pulley H through the belt 55 and pulley 56 which is mounted on the shaft 46.

As the tractor moves forward over the grass, the reel is revolved from four to five hundred revolutions per minute depending upon the cacti to be operated upon. The paddles are normally about two inches above the ground and do not interfere with the grass, but when a cactus bed is encountered, the rapid circular movement of the reel causes the paddles to sweep the cacti from the ground, tearing it into bits. The paddles do not cut in the sense of a lawn mower, but literally rend the cacti into small particles and sweep them with a paddle action.

By use of the adjusting means for the bearing plate 11, the outer end of the shaft 50 can be raised or lowered to adjust the distance from the ground and the housing 14 can be adjusted to the desired distance from the ground by use of its lifting means. The universal joint 47 permits the reel to operate along uneven ground. If enough resistance is met by the reel to prevent its turning, the friction clutch 49 will permit the shaft 46 to continue its revolutions without injury to the tractor mechanism.

Having thus described my invention what I claim as new and desire to secure by Letters Patent is:

1. The combination of a tractor and an attachment therefor to eradicate cacti, said attachment comprising a vertically disposed frame spaced from the side of said tractor; a supporting arm mounted on the front of said tractor; a collar disposed about the steering column of said tractor; a cable attached to said collar; a hook attached to said cable and hooked into the outer end of said supporting arm; a bar connecting said supporting arm and said vertically disposed frame; a bearing plate mounted on said frame; vertical adjusting means for said bearing plate mounted on said frame; a pair of vertically disposed guides mounted on each side of said tractor; a housing disposed transversely with respect to said tractor and slidably mounted in said guides so as to move vertically; lifting means for said housing mounted on said tractor; an actuating shaft journalled in said housing and extending therethrough; an intermediate shaft; a universal joint connecting said actuating shaft and said intermediate shaft; a third shaft connected to said intermediate shaft and journalled in said bearing plate; spiders mounted on said third shaft; longitudinal bars mounted on the legs of said spiders; and a plurality of paddles disposed radially and mounted on said longitudinal bars.

2. The combination of a tractor and an attachment therefor, said attachment comprising a vertical frame spaced from the side of said tractor; a supporting arm mounted on the front end of said tractor; a bar connecting said supporting arm and said frame; a bar connecting the rear of said frame with the rear end of said tractor; a vertically disposed bearing plate slidably mounted on said frame; means to adjust said bearing plate, mounted on said frame; a caster wheel having its shank journalled in the front end of said frame; a caster wheel having its shank journalled in the rear portion of said frame; vertical guides mounted on each side of said tractor; a housing slidably mounted in said guides; lifting means for said housing mounted on said tractor; an actuating shaft journalled in said housing and extending therethrough; an intermediate shaft; a universal joint connecting said intermediate shaft and said actuating shaft; a shaft journalled in said bearing plate; means connecting said last named shaft with said intermediate shaft; a series of spiders mounted on said last named shaft; longitudinal bars mounted on the legs of said spiders; and a series of radially disposed paddles mounted on each longitudinal bar.

3. The combination of a tractor and an attachment therefor to eradicate cacti, said attachment comprising a vertical frame spaced from the side of said tractor; a supporting arm mounted on the front of said tractor and extending to one side thereof; a bar connecting said supporting arm and said frame; a bar connecting the rear of said frame to the rear of said tractor; a bearing plate mounted on said frame; a caster wheel having its shank journalled in the front portion of said frame; a leveling shoe mounted on the shank of said caster wheel; a caster wheel having its shank journalled in the rear of said frame; vertically disposed guides mounted on each side of said tractor; a housing slidably mounted in said vertical guides; lifting means for said housing mounted on said tractor; an actuating shaft journalled in said housing and extending therethrough; an intermediate shaft; connecting means between said actuating shaft and said intermediate shaft; a spider carrying shaft journalled in said bearing plate; connecting means between said intermediate shaft and said spider carrying shaft; spiders mounted on said spider carrying shaft; longitudinal bars mounted on said spiders; and a series of radially disposed paddles mounted on each longitudinal bar.

4. The combination of a tractor and an attachment therefor to eradicate cacti, said attachment comprising a vertical frame spaced from the side of said tractor; a bearing plate on said frame; an arm mounted on the front of said tractor and extending to the side thereof; a bar connecting said frame to said arm; a bar connecting the rear of said frame to the rear of said tractor; vertically disposed guides mounted on each side of said tractor; a housing slidably mounted in said guides; lifting means for said housing; an actuating shaft journalled in said housing; a pulley mounted on one end of said actuating shaft; an intermediate shaft; means connecting said intermediate shaft and said actuating shaft; a spider carrying shaft journalled in said bearing plate; means connecting said spider carrying shaft and said intermediate shaft; spiders mounted on said spider carrying shaft; longitudinally disposed angle bars mounted on the legs of said spiders; and a plurality of radially disposed paddles mounted on each longitudinal angle bar.

5. A cacti eradicator attachment for tractors, comprising a vertically disposed frame; a supporting arm adapted to be mounted on the front end of a tractor; a bar connecting said supporting arm and said frame; a bar connected to the rear of said frame and adapted to be connected to the rear of a tractor; a caster wheel mounted in the front end of said frame and a caster wheel mounted in the rear end of said frame; vertically disposed guides adapted to be mounted on a tractor and extend downward; a housing normally mounted in said guides so as to slide vertically; an actuating shaft journalled in said housing and extending therethrough; an intermediate shaft; a universal joint connecting said intermediate shaft and said actuating shaft; a spider carrying shaft; means connecting said spider carrying shaft and said intermediate shaft; a bearing plate slidably mounted on said frame, and provided with a bearing in which said spider carrying shaft is journalled; angle bars mounted on said spiders; and a plurality of radially disposed paddles mounted on each angle bar.

6. A cacti eradicating attachment for tractors, comprising a supporting arm adapted to be mounted on the front end of a tractor and to extend to one side thereof; a vertically disposed frame structure; a bearing in said frame structure; a bar connecting the front end portion of said frame structure with the outer end of said supporting arm; a bar connected to the rear end portion of said frame structure and adapted to be attached to the rear portion of said tractor; a cable connected to the outer end of said supporting arm and adapted to be attached to the steering column of said tractor; a caster wheel mounted in the front end and a caster wheel mounted in the rear end of said frame structure; vertically disposed guides adapted to be attached to the side bars of said tractor; a housing mounted in said guides so as to slide vertically; an actuating shaft journalled in said housing and extending therethrough; a reel carrying shaft having one end journalled in the bearing in said frame structure; means connecting said reel carrying shaft with said actuating shaft; a reel provided with longitudinally disposed angles; a plurality of paddles spaced from each other and mounted on each angle so as to extend radially with respect to said reel carrying shaft; and means to adjust said housing vertically, adapted to be attached to said tractor.

7. A cacti eradicating attachment for tractors, comprising a supporting arm adapted to be mounted on the front end of a tractor and to extend to one side thereof; a vertically disposed frame structure; a bearing in said frame structure; a bar connecting the front end portion of said frame structure with the outer end of said supporting arm; a bar connected to the rear end of said frame structure and adapted to be attached to the rear portion of said tractor; a caster wheel mounted in the front of said frame structure; a caster wheel mounted in the rear end of said frame structure; vertically disposed guides adapted to be attached to the side bars of said tractor; a horizontally disposed housing mounted in said guides so as to slide vertically; an actuating shaft journalled in said housing and extending therethrough; a reel carrying shaft one end of which is journalled in the bearing in said frame structure; means connecting said reel carrying shaft with said actuating shaft; a reel provided with longitudinally disposed angles; and a plurality of paddles spaced from each other and mounted on each angle so as to extend radially with respect to said reel carrying shaft.

8. A cacti eradicating attachment for tractors, comprising a supporting arm adapted to be mounted transversely on the front end of a tractor and to extend to one side thereof; a vertically disposed frame structure; a bearing in said frame structure; a bar connecting the front end portion of said frame structure with the outer end of said supporting arm; an arm connected to the rear end of said frame structure and adapted to be attached to the rear portion of said tractor; vertically disposed guides adapted to be attached to the side bars of said tractor; a horizontally disposed housing mounted in said guides so as to slide vertically; an actuating shaft journalled in said housing and extending therethrough; a reel carrying shaft having one end journalled in the bearing in said frame structure; means connecting said reel carrying shaft and said actuating shaft; a reel on said reel carrying shaft, provided with a plurality of longitudinally disposed angles; a plurality of paddles spaced from each other and mounted on each angle so as to extend radially with respect to said reel carrying shaft; and means to vertically adjust the positions of said housing, said last named means being adapted to be mounted on said tractor.

9. A cacti eradicating attachment for tractors, comprising a supporting arm adapted to be mounted transversely on the front end of a tractor and to extend to one side thereof; a vertically disposed frame structure; a bearing in said frame structure; a bar connecting said frame structure with the outer end of said supporting arm; a bar connected to the rear of said frame structure and adapted to be attached to the rear portion of said tractor; a pair of vertically disposed guides adapted to be attached to the side bars of said tractor; a housing slidably mounted in said guides; an actuating shaft journalled in said housing and extending therethrough; an intermediate shaft; a universal joint connecting said actuating shaft and said intermediate shaft; a reel carrying shaft having one end journalled in the bearing in said frame structure and the other end connected to said intermediate shaft; a reel mounted on said reel carrying shaft and provided with longitudinally disposed blades; and a plurality of paddles spaced from each other and mounted on each longitudinally disposed blades of said reel.

JAMES W. DENNIS.